J. SACHS.
COUPLING.
APPLICATION FILED NOV. 5, 1908.
1,012,102.
Patented Dec. 19, 1911.
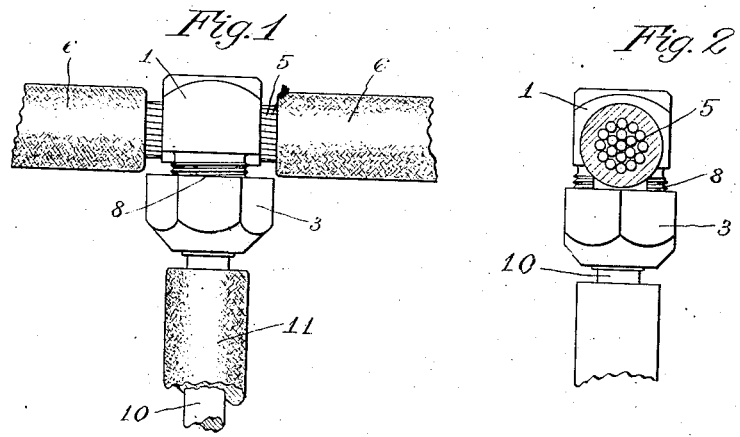
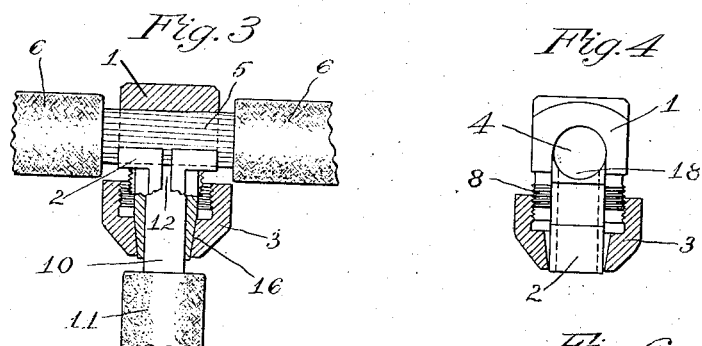
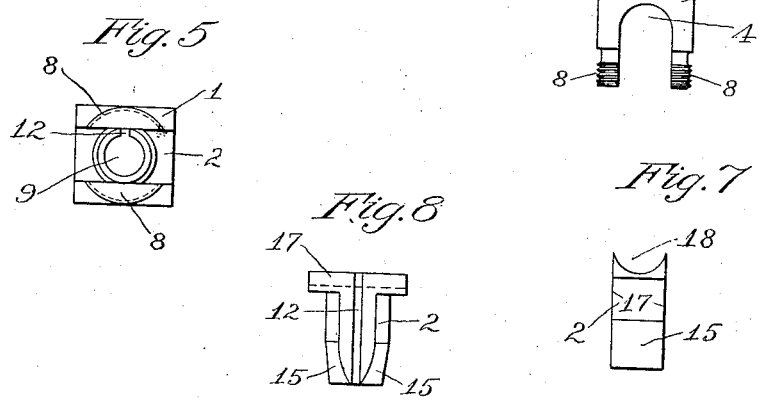
Witnesses:
Charles F. Storrs
A. B. Cormier.
Inventor:
Joseph Sachs.
By Wm H Homiss, Atty.

UNITED STATES PATENT OFFICE.

JOSEPH SACHS, OF HARTFORD, CONNECTICUT, ASSIGNOR TO THE SACHS COMPANY, OF HARTFORD, CONNECTICUT, A CORPORATION OF CONNECTICUT.

COUPLING.

1,012,102.  Specification of Letters Patent.  Patented Dec. 19, 1911.

Application filed November 5, 1908. Serial No. 461,142.

*To all whom it may concern:*

Be it known that I, JOSEPH SACHS, a citizen of the United States, and resident of Hartford, in the county of Hartford and State of Connecticut, have invented certain new and useful Improvements in Couplings, of which the following is a full, clear, and exact specification.

This invention relates to couplings for two joining members of various kinds, such as main and branch wires, rods, pipes, or cables, either mechanically or electrically, or both.

The invention is herein shown to be embodied in what is commonly known as a tap joint or coupling for joining a branch line electrical conductor to a main line conductor, the object in this case being to make a secure and compact mechanical and electrical connection, which can be made quickly, clamping both the main and the branch lines and drawing them together by a single or unitary operation or movement or action.

Figure 1 of the drawings is a side exterior view of the coupling shown in clamped position upon a main and branch line. Fig. 2 is an end view projected from Fig. 1. Fig. 3 is a sectional side view, similar to Fig. 1, with the coupling members shown in section. Fig. 4 is an end view of the coupling of the previous figures, with the clamping nut shown in section. Fig. 5 is an underneath view of the coupling of Fig. 4, with the clamping nut omitted. Fig. 6 is an end view of the strap. Fig. 7 is an edge view, and Fig. 8 a side view of the compression sleeve for the branch line.

This coupling, in the form shown in the drawings, consists of three parts, the bifurcated strap member 1, the compression sleeve 2, and the clamping nut 3. The opening 4 in the strap member is preferably U-shaped, the concaved bottom fitting approximately one-half of the circumference of the main line 5, which is herein shown to be a cable consisting of a number of strands of wires, which are generally provided with insulation 6. The outside bifurcated ends of the strap are provided with screw threads 8, upon which the clamping nut 3 is fitted.

The compression sleeve 2 is provided with a longitudinal aperture 9 for receiving the branch line 10, which in this case is shown to be a wire or rod provided with insulation 11. To facilitate the closing of the sleeve it is split longitudinally at 12, and is provided with the beveled surface 15 fitting a correspondingly tapered portion 16 of the nut 3. The opposite sides of the sleeve are preferably flattened at 17 to fit into the U-shaped openings 4 of the strap 1, and the base of the sleeve is concavely recessed at 18 to fit against the corresponding side of the main line cable 5, to extend the area of contact therewith to secure a more perfect electrical connection, and also serve to prevent the sleeve from turning, in cases where that function is not attended to by the flattened sides 17 of the sleeve.

The outer surface of the clamping nut 3 is preferably made square or polygonal to receive a wrench, although it may obviously be adapted to receive a spanner wrench or pliers, or other tools used by an electrician or other mechanic.

In connecting the main and branch line by means of this coupling, the lines are bared of their insulation and the strap 1 is placed over the main line, the sleeve 2 is inserted between the open ends, and the nut 3 screwed part way on. After placing the end of the branch line 10 in position in the sleeve, the nut 3 is tightened, its tapering surface 16 bearing against the beveled surface 15 of the sleeve 2, compressing it upon the branch member 10, and at the same time forcing it endwise, thereby clamping its concaved base 18 against one side of the main line 5, the concaved bottom of the U-shaped opening 4 of the strap being by the same movement of the nut drawn against the opposite side of the main line, so that both parts are securely clamped and the branch member forced endwise against the main member by the unitary operation, or movement, or action of screwing the nut upon the strap 1. This avoids the necessity of two separate operations or movements for tightening the joint upon the main line and the branch line, and also avoids the liability of neglecting, through oversight, to tighten one of them. The parts are released with equal ease by merely unscrewing the nut 3, reversing the assembling and tightening operation just described.

The component parts of this coupling are simple in form as well as being few in number, and are adapted to be manufactured at low cost by modern methods, most of the work being adapted to be done on automatic screw machines, by which great economy of manufacture is attained.

The body of the strap 1 is herein shown to be square, although obviously it may be cylindrical, and in that case be made of round stock. It is, however, considered preferable to make it with a square or polygonal body, in order that a wrench may be used upon it if necessary, in connection with another wrench upon the nut 3, for tightening the coupling where exceptional tightness is desired.

Obviously the form, proportions, and other details of the various parts of this coupling may be modified in many ways to suit various requirements, or different conditions of service.

The terms "main line", "branch line", and perhaps other terms, are not necessarily used in their absolute sense, but mainly for convenience and clearness of description. The connection may be made at any desired portion of the main line, including its ends, so that the joint made might be L-shaped instead of the T shape herein shown. Nor is it essential to set the branch line at right angles with the main line, as herein shown, since the parts may be set at any desired angle.

Instead of being split and clamped upon the branch line the sleeve 2, or any suitable head or collar may be driven, or soldered, or riveted on the end of the branch. Or the end of the branch itself may be headed or otherwise shaped to adapt it to the coupling function herein described. In such cases the nut 3 may be slipped on the branch line before securing or forming the sleeve or head thereon; or the nut may be slipped over the branch from its opposite end. The arrangement herein shown, however, enables the joint to be disconnected and reconnected easily, without removing, or even separating, any of the members of the clamping joint, except the wires themselves, thus keeping the parts together and avoiding the possible loss of some of them, while enabling the joint to be quickly and securely remade merely by slipping the end of the branch line into position and tightening the entire joint by a single movement.

I claim as my invention:—

1. A coupling for two members including means for clamping one member and drawing the end of the other member endwise toward the side of the first member to secure them together by a single action.

2. A coupling for two lines, including clamping means for each of the said lines, and unitary means for operating the clamping device, to draw one of said lines endwise toward the other line and secure them together by a single action.

3. In a coupling, the combination of a clamp for a main line, a clamp for detachably holding a branch line in endwise relation to the main line, and unitary means for operating the said clamps to tighten them both upon their respective lines by a single action.

4. Means for coupling a main line and branch line, including in combination a clamp for the main line, a clamp for the branch line, and means for tightening the latter clamp upon its branch line and against the main line by a single movement, carrying the said branch line endwise with it.

5. Means for mechanically and electrically coupling a main line and a branch line, including in combination a clamping member for the main line, a clamp for the branch line, coacting with the aforesaid member for clamping the main line, and unitary means for operating the branch line clamp by a single movement, to tighten it and carry the branch line endwise toward the main line.

6. Means for electrically and mechanically connecting a main line and a branch line, including in combination a clamping member for the main line, a clamp for the branch line, and unitary means coöperating with the first named member for tightening the branch clamp and clamping it against the main line, in a direction to carry one of said lines endwise toward the other line.

7. The combination with main line engaging means and branch line engaging means, of unitary means for clamping the said engaging means upon their respective lines, and moving one line endwise toward the other line.

8. A coupling consisting of clamping members for a main and a branch line, and unitary means for drawing the two members together to clamp them upon their respective lines moving one line endwise toward the other line.

9. Means for coupling a main line and a branch line together, including in combination a clamping member for the main line, a clamping member for holding the branch line in substantially radial relation to the main line, coöperating with the first named member for clamping the main line, and unitary means for closing the said clamps upon both lines by a single action.

10. A coupling consisting of a main line strap, a branch line sleeve, and a clamping nut engaging with the said strap and sleeve for closing them upon their respective lines.

11. A coupling including in combination a main line strap, a branch line sleeve and a clamping nut threaded upon the said strap and engaging the said sleeve to close the said sleeve and draw the said sleeve and strap toward each other against the main line.

12. A coupling including in combination a U-shaped strap for the main line, a compression sleeve for the branch line, and a clamping nut threaded upon the open end of the said U-shaped main line strap and engaging with the said sleeve to compress the sleeve and clamp it and the said strap upon the main line.

13. A coupling including in combination a U-shaped strap for the main line, a compression sleeve for the branch line seated between the open ends of the U-shaped strap, and a clamping nut threaded upon the said open ends and engaging with the sleeve to compress the sleeve and draw it into the open ends of the strap against the main line.

14. A coupling including in combination a compression sleeve for a branch line, a strap provided with a U-shaped opening for receiving a main line and the said sleeve, and a clamping nut surrounding the said sleeve and threaded upon the outside of the U-shaped ends of the strap for compressing the sleeve, and drawing it into the U-shaped opening against the main line.

15. A coupling including in combination a main line strap, a branch line terminal seated in the said strap, and a clamping nut threaded upon the strap and engaging the said terminal for drawing it into its seat in the strap against the main line, at the same time drawing the said branch line toward said main line.

16. A coupling including in combination a strap provided with a U-shaped opening, a compression sleeve for receiving a branch line, seated in the said U-shaped opening, and having a beveled outer surface, and a clamping nut threaded upon the outside of the open U-shaped ends of the strap, and engaging the said beveled portion of the sleeve for compressing the sleeve and drawing it into its seat in the strap against the main line.

17. A coupling including in combination a bifurcated main line strap, a clamping sleeve for a branch line seated between the bifurcations of the strap, and provided with a beveled outer surface, and a clamping nut threaded upon the outside of the bifurcations of the strap, and engaging with the beveled surface of the sleeve to compress the sleeve and draw it into its seat between the bifurcated ends of the strap, and against the main line.

18. A coupling including in combination a bifurcated strap for a main line, a compression sleeve for a branch line, provided with a beveled surface, and means engaging with the said beveled surface and with the strap for compressing the said sleeve and drawing it between the bifurcated ends of the strap against the main line.

19. A connecting joint including in combination a compression sleeve for a branch line, provided with a beveled surface, a strap provided with a U-shaped opening for receiving the main line and the said sleeve, and means coacting with the said strap and the beveled surface of the sleeve for compressing the sleeve and clamping it against the main line.

20. A connecting joint including in combination a strap provided with a U-shaped opening having a concaved bottom for receiving the main line, a compression sleeve for a branch line provided with a beveled compressing surface, and having a concave base for fitting against the main line, and a nut threaded upon the outside of the strap and engaging the beveled surface of the sleeve for compressing the sleeve upon the branch line and clamping the main line between the concaved bottom of the U-shaped opening and the concave base of the sleeve.

In testimony whereof I have signed my name to this specification in the presence of two subscribing witnesses.

JOSEPH SACHS.

Witnesses:
 JOSEPH MERRITT,
 CAROLINE M. BRECKLE.